United States Patent
Liao (10) Patent No.: US 9,037,141 B2
(45) Date of Patent: May 19, 2015

(54) METHOD OF HANDLING QUERIES-CAUSED OVERLOAD IN WIRELESS COMMUNICATION SYSTEM

(75) Inventor: Ching-Yu Liao, Taoyuan County (TW)

(73) Assignee: HTC Corporation, Taoyuan District, Taoyuan (TW)

(*) Notice: Subject to any disclaimer, the term of this patent is extended or adjusted under 35 U.S.C. 154(b) by 0 days.

(21) Appl. No.: 13/292,058

(22) Filed: Nov. 8, 2011

(65) Prior Publication Data

US 2012/0115492 A1 May 10, 2012

Related U.S. Application Data (60) Provisional application No. 61/410,944, filed on Nov. 8, 2010, provisional application No. 61/441,659, filed on Feb. 11, 2011.

(51) Int. Cl.
| | |
|---|---|
| *H04W 40/00* | (2009.01) |
| *H04W 24/00* | (2009.01) |
| *H04W 8/30* | (2009.01) |
| *H04W 8/12* | (2009.01) |
| *H04W 8/02* | (2009.01) |
| *H04W 8/24* | (2009.01) |
| *H04W 68/00* | (2009.01) |

(52) U.S. Cl.
CPC ...... *H04W 8/30* (2013.01); *H04W 8/12* (2013.01); *H04W 8/02* (2013.01); *H04W 8/24* (2013.01); *H04W 68/00* (2013.01)

(58) Field of Classification Search
USPC .......... 455/435.1, 435.2, 445; 370/328, 329, 370/338
See application file for complete search history.

(56) References Cited

U.S. PATENT DOCUMENTS

| | | | |
|---|---|---|---|
| 6,356,755 B1* | 3/2002 | Valentine et al. | 455/435.1 |
| 2010/0195640 A1* | 8/2010 | Park et al. | 370/350 |

FOREIGN PATENT DOCUMENTS

| | | |
|---|---|---|
| CN | 101052209 A | 10/2007 |
| CN | 101772071 A | 7/2010 |
| WO | 0225868 A2 | 3/2002 |

OTHER PUBLICATIONS

3GPP TS 23.401 V10.1.0 (Sep. 2010) Technical Specification 3rd Generation Partnership Project; Technical Specification Group Services and System Aspects; General Packet Radio Service (GPRS) enhancements for Evolved Universal Terrestrial Radio Access Network (E-UTRAN) access (Release 10), Sep. 2010.*

European patent application No. 11008873.9, European Search Report mailing date: Jul. 6, 2012.

(Continued)

*Primary Examiner* — Vladimir Magloire
*Assistant Examiner* — Erica Navar
(74) *Attorney, Agent, or Firm* — Winston Hsu; Scott Margo (57) ABSTRACT

A method of handling queries caused overload in a core network of a wireless communication is disclosed. The core network comprises a data base and a network control node which stores a mobility management (MM) context of a mobile device. The method comprises the network node sending information in a notification message to the data base, wherein the information comprises at least one of International Mobile Subscriber Identity (IMSI), UE Reachability Request Parameter for the MME/SGSN (URRP-MME/URRP-SGSN), and a session management (SM) and/or mobility management (MM) back-off timer or a back-off indicator.

10 Claims, 8 Drawing Sheets

(56) References Cited

OTHER PUBLICATIONS

HTC, "Back-off UEs induced MME and HSS overload", 3GPP TSG SA WG2 Meeting #82, S2-105485, Nov. 15-19, 2010, Jacksonville, Florida, USA, XP050522873, p. 1-4.

HTC, "Back-off MSs induced SGSN and HSS/HLR overload", 3GPP TSG SA WG2 Meeting #82, S2-105486, Nov. 15-19, 2010, Jacksonville, Florida, USA, XP050522874, p. 1-4.

3GPP TS 23.401 V10.1.0 (Sep. 2010) Technical Specification 3rd Generation Partnership Project; Technical Specification Group Services and System Aspects; General Packet Radio Service (GPRS) enhancements for Evolved Universal Terrestrial Radio Access Network (E-UTRAN) access (Release 10).

3GPP TS 24.301 V10.0.0 (Sep. 2010) Technical Specification 3rd Generation Partnership Project; Technical Specification Group Core Network and Terminals; Non-Access-Stratum (NAS) protocol for Evolved Packet System (EPS); Stage 3 (Release 10).

Office action mailed on Nov. 26, 2013 for the China application No.20110351488.9, filing date Nov. 8, 2011.

* cited by examiner

METHOD OF HANDLING QUERIES-CAUSED OVERLOAD IN WIRELESS COMMUNICATION SYSTEM

CROSS REFERENCE TO RELATED APPLICATIONS

This application claims the benefit of U.S. Provisional Application No. 61/410,944, filed on Nov. 8, 2010 and entitled "Method for avoiding HSS-HLR overload caused by back-off time", and the benefit of U.S. Provisional Application No. 61/441,659, filed on Feb. 11, 2011 and entitled "Method for avoiding HSS-HLR overload caused by back-off time", the contents of which are incorporated herein in their entirety.

BACKGROUND OF THE INVENTION

1. Field of the Invention

The application relates to a method in a wireless communication system and related communication device, and more particularly, to method of reducing overload in a data base in a wireless communication system.

2. Description of the Prior Art

A long-term evolution (LTE) system supporting the 3GPP Rel-8 standard and/or the 3GPP Rel-9 standard is developed by the 3rd Generation Partnership Project (3GPP) as a successor of a universal mobile telecommunications system (UMTS), for further enhancing performance of the UMTS to satisfy users' increasing needs. The LTE system includes a new radio interface and radio network architecture that provides a high data rate, low latency, packet optimization, and improved system capacity and coverage. In the LTE system, a radio access network known as an evolved UTRAN (E-UTRAN) includes multiple evolved NBs (eNBs) for communicating with multiple user equipments (UEs), and communicates with a core network including a mobility management entity (MME), serving gateway, etc for Non Access Stratum (NAS) control. In UMTS system, a Serving GPRS Support Node (SGSN) is responsible for the delivery of data packets to the mobile devices back and forth within its geographical service area, including packet routing and transfer, mobility management (attach/detach and location management), logical link management, and authentication and charging functions. The MME also provides the control plane function for mobility between LTE and 2G/3G access networks with the S3 interface terminating at the MME from the SGSN.

An access point name (APN) is used in the LTE system and the LTE-A system for establishing packet data connections, and is managed by the MME. Further, the APN is used for identifying a packet data network (PDN) or a service type (e.g. multimedia messaging service (MMS)), wherein the PDN or the service type is carried on the packet data connections.

NAS level congestion control contains the functions: "APN based congestion control" and "General NAS level Mobility Management control". The use of the APN based congestion control is for avoiding and handling of congestion associated with a particular APN. Both UEs and network shall support the functions to provide APN based congestion control. With General NAS level Mobility Management control, the MME may also use the reject of NAS level Mobility Management signaling requests under general congestion conditions.

The MME may store a Mobility Management back-off time and a Session Management back-off time when congestion control is active for general NAS MM congestion control or APN based SM congestion control. The MME may enforce the stored back-off time by immediately rejecting any subsequent request from the UE targeting at connecting to the APN before the stored back-off time is expired.

The MME may reject the PDN Connectivity Request with a Session Management back-off timer for congested APNs. If UE provides no APN, then default APN from subscription data is used by the MME. A PDN Gateway (GW) may provide mechanisms for avoiding and handling overload situations. These include the rejection of PDN connection requests from UEs.

When performing overload control the PDN GW rejects PDN connection requests. When receiving the rejection from the PDN GW, the MME rejects the UE's PDN connection request as specified in clause 4.3.7.4.2. of 3GPP.

Due to the rejected UEs perform back-off, the associated service-related entity, e.g. application server, may request the HSS/HLR to provide the reachabilities of the UEs. The HSS/HLR thus sets URRP-MME/URRP-SGSN parameter for each queried UE and sends this parameter to the MME/SGSN via UE-REACHABILITY-NOTIFICATION-REQUEST message. With this request message, the MME/SGSN sets the URRP-MME parameter in the MM Context to monitor the queried UE activity.

The problem is caused when the MME blocks massive UEs with long back-off timers. There may have massive queries from the associated service-related entities to the HSS/HLR which results in HSS/HLR overload. This is because the HSS/HLR has to store massive queries and signal the queries to the registered MME/SGSN. Then the MME/SGSN sets URRP-MME parameters in MM Context of each queried UE. The overload problem may propagate from the HSS/HRL to the MME/SGSN even when the rejected but queried UEs which have MM context in the MME/SGSN do not have any activities due to back-off.

SUMMARY OF THE INVENTION

A method of reducing overload in a data base in a wireless communication system is provided.

A method of handling queries caused overload in a core network of a wireless communication is disclosed. The core network comprises a data base and a network control node which stores a mobility management (MM) context of a mobile device. The method comprises the network node sending information in a notification message to the data base, wherein the information comprises at least one of International Mobile Subscriber Identity (IMSI), UE Reachability Request Parameter for the MME (URRP-MME), and a session management (SM) and/or mobility management (MM) back-off timer.

A method of handling queries caused overload in a core network of a wireless communication is disclosed. The core network comprises a data base and a network control node which stores a mobility management (MM) context of a mobile device. The method comprises the network control node sending the information in the notification message to the data base, wherein the information comprises at least one of a session management (SM) and/or mobility management (MM) back-off time and congested access point name (APN) information.

A method of handling queries caused overload in a core network of a wireless communication is disclosed. The core network comprises a data base and a network control node, the network control node storing a back-off status of a mobile device. The method comprises the network control node not setting a UE Reachability Request Parameter for the MME (URRP-MME) and responding to the data base for the inactivity of the back-off UE when receiving a UE reachability notification request message for the mobile device whose back-off status is active or whose back-off timer is still running A method of handling queries caused overload in a core network of a wireless communication is disclosed. The core network comprises a data base and a network control node which storing a mobility management (MM) context of a mobile device. The method comprises the network control node sending information in a notification message to the data base when the network control node sends a mobility management (MM) back-off timer and/or a session management (SM) back-off timer to the mobile device to reject a request from the mobile device, wherein the information comprises at least one of International Mobile Subscriber Identity (IMSI), UE Reachability Request Parameter for the MME/SGSN (URRP-MME/URRP-SGSN), and a back-off indicator.

These and other objectives of the present invention will no doubt become obvious to those of ordinary skill in the art after reading the following detailed description of the preferred embodiment that is illustrated in the various figures and drawings.

DETAILED DESCRIPTION

The NAS level congestion control contains the functions: "APN based congestion control" and "General NAS level Mobility Management control". The MME can set a Mobility Management back-off time and a Session Management back-off time when congestion control is active for general NAS MM congestion control or APN based SM congestion control. The NAS level congestion control may be both activated in the network control node. The UE may be rejected from different request messages, and thus may have both of mobility management and session management back-off timers.

Figure 1:
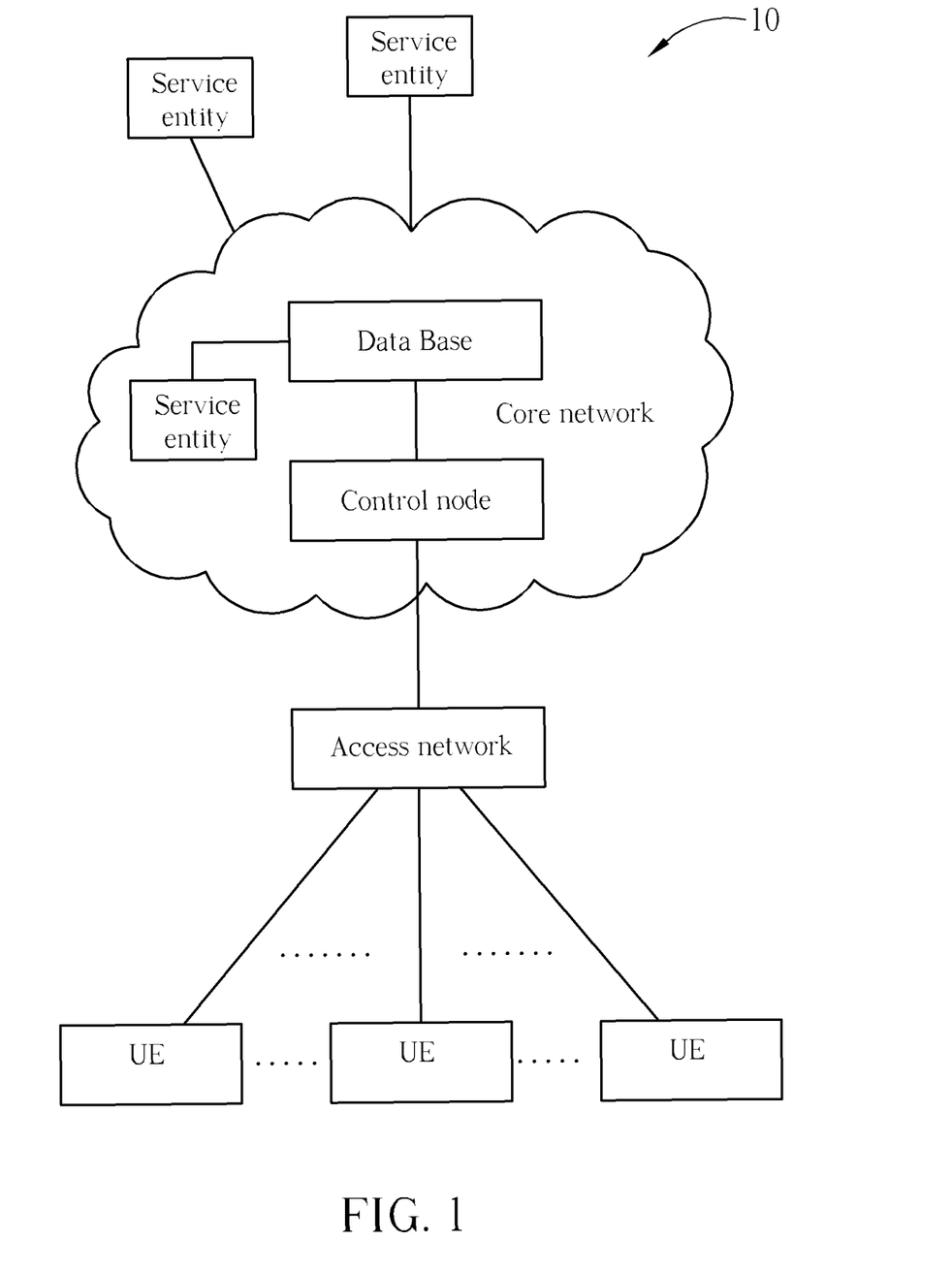
FIG. 1 illustrates a schematic diagram of an exemplary wireless communication system 10

Please refer to FIG.1, which illustrates a schematic diagram of an exemplary wireless communication system 10. Briefly, the wireless communication system 10 is composed of a core network including a data base and a network control node, an access network and a plurality of mobile devices. The wireless communication system 10 can be a GPRS (General Packet Radio Service) system, or any other similar network system such as a GSM (Global System for Mobile communications) system, a UMTS (Universal Mobile Telecommunications System) system, an LTE (long-term evolution) or LTE-Advance system. The data base, preferably, can be a Home Subscriber Server (HSS) or a Home Location Register (HLR).The HSS is a central database that contains user-related and subscription-related information. The functions of the HSS include functionalities such as mobility management, call and session establishment support, user authentication and access authorization. The service-related entity, e.g. application server, may be inside or outside of the 3GPP system. The service-related entity may indirectly connect to network entity, e.g. HSS/HLR, MME/SGSN, in 3GPP network via network gateway or interworking function, or directly connect to HSS/HLR after appropriate authorization process. For the indirect model, the gateway or interworking function can query the reachability of the UE on behalf of the service related entity. The queries caused overload may be happened in the data base (e.g. HSS/HLR), network control node (e.g. MME/SGSN/MSC), or network gateway/interworking function which is between HSS/HLR and the service-related entity.

In FIG. 1, the access network and the UEs are simply utilized for illustrating the structure of the wireless communication system 10. Practically, the access network of the LTE system comprises a plurality of base stations such as an E-UTRAN (evolved-UTAN), which comprises a plurality of evolved Node-Bs (eNBs). In LTE, the core network includes a data base, a network control node, e.g. mobility management entity (MME). The MME is responsible for the delivery of data packets to the mobile devices back and forth within its geographical service area, including packet routing and transfer, mobility management (attach/detach and tracking area management), session management (PDN connection establishment/disconnect), logical link management, and authentication and charging functions. The MME can also serve as a local mobility anchor for inter-working with other RATs (e.g. GSM and UMTS). The access network of the UMTS system comprises a plurality of base stations such as an UTRAN, which comprises a plurality of Node-Bs (NBs). In UMTS, the core network includes a data base, a network control node, e.g. Serving GPRS Support Node (SGSN). The SGSN is responsible for the delivery of data packets to the mobile devices back and forth within its geographical service area, including packet routing and transfer, mobility management (attach/detach and tracking area management), session management (PDP Context establishment/disconnect), logical link management, and authentication and charging functions. The access network of the GSM system comprises a plurality of base stations such as a GERAN, which comprises a plurality of Base stations (BSSs). In GSM, the core network includes a data base, a network control node, e.g. Mobile Switching Center (MSC). The MSC is responsible for the delivery of voice service in circuit switch manner to the mobile devices back and forth within its geographical service area, including mobility management (attach/detach and location area management), logical link management, and authentication and charging functions. The UEs can be devices such as mobile phones, computer systems, etc. Besides, the access network and the UE can be seen as a transmitter or receiver according to transmission direction, e.g., for uplink, the UE is the transmitter and the network is the receiver, and for downlink, the network is the transmitter and the UE is the receiver.

Figure 2:
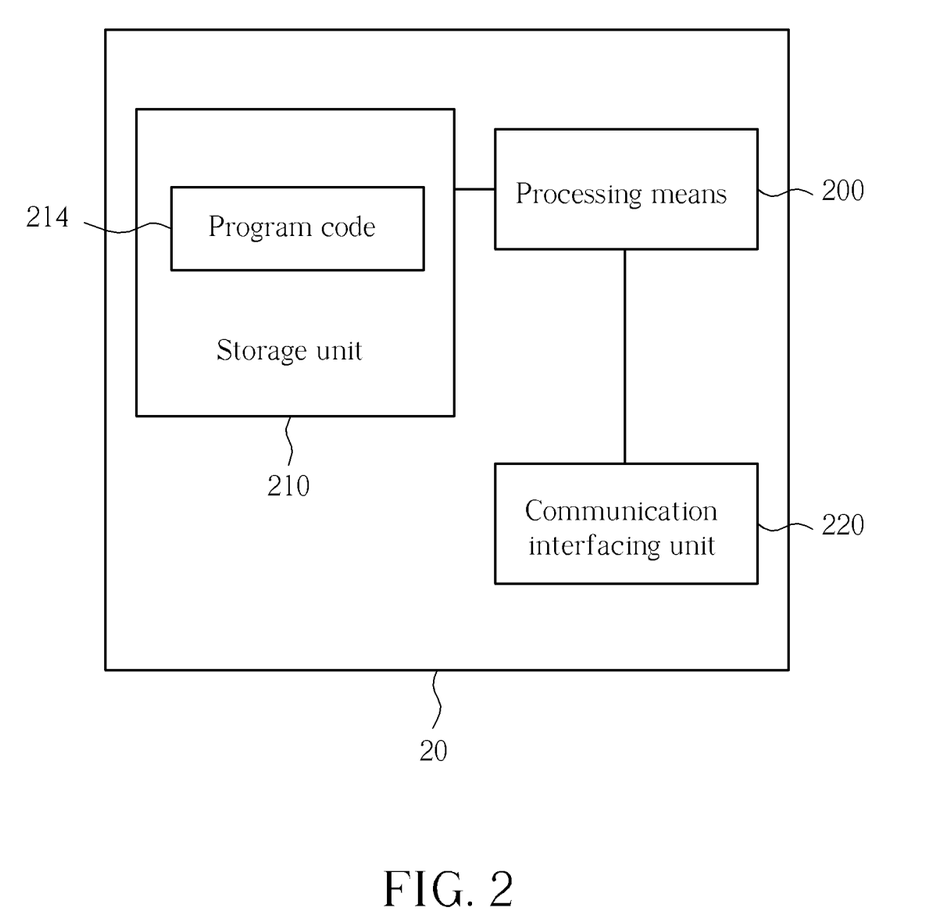
FIG. 2 is a schematic diagram of an exemplary communication device.

Please refer to FIG. 2, which is a schematic diagram of an exemplary communication device 20. The communication device 20 can be the UE or the core network shown in FIG. 1, but is not limited herein. The communication device 20 may include a processor 200 such as a microprocessor or an Application Specific Integrated Circuit (ASIC), a storage unit 210 and a communication interfacing unit 220. The storage unit 210 may be any data storage device that can store a program code 214, accessed by the processor 200. Examples of the storage unit 210 include but are not limited to a subscriber identity module (SIM), read-only memory (ROM), flash memory, random-access memory (RAM), CD-ROM/DVD-ROM, hard disk, and optical data storage device. The communication interfacing unit 220 is preferably a transceiver and can handle timer configuration according to processing results of the processor 200.

Figure 3:
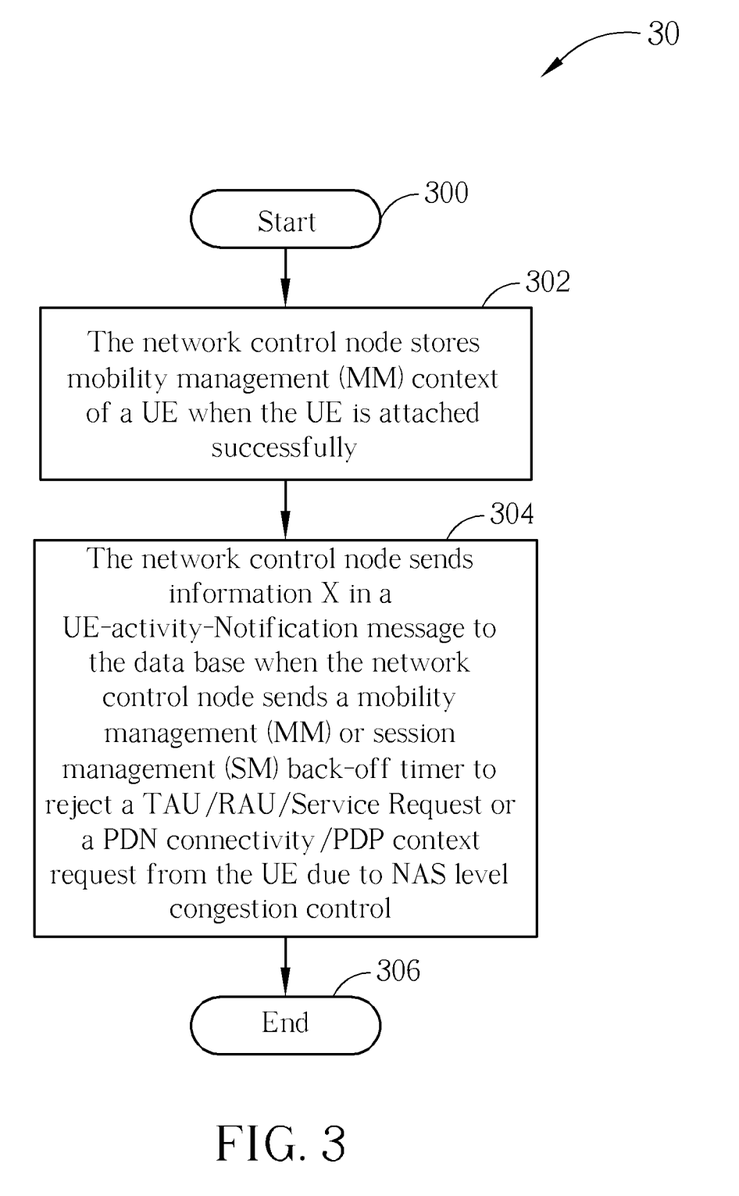
FIGS. 3-8 are flow charts of exemplary processes.

Please refer to FIG.3, which is a flowchart of an exemplary process 30. The process 30 is used for handling queries caused overload in the data base (e.g. HSS/HLR) and network control node (e.g. MME/SGSN/MSC) in the core network in the wireless communication system 10. The process 30 may be compiled into the program code 214 and includes the following steps:

Step 300: Start.

Step 302: The network control node stores mobility management (MM) context of a UE when the UE is attached successfully.

Step 304: The network control node sends information X in a UE-activity-Notification message to the data base when the network control node sends a mobility management (MM) or session management (SM) back-off timer to reject a TAU/RAU/Service Request or a PDN connectivity/PDP context request from the UE due to NAS level congestion control.

Step 306: End.

According to the process 30, the core network stores the MM context of the UE when the UE is attached to the access network. The core network sends the information X in the UE-activity-Notification message to the data base when the network control node sends the MM back-off or SM back-off timer to reject the TAU/RAU/Service Request or PDN connectivity/PDP context request from the UE. The rejection of the PDN connectivity/PDP context request could be caused by the APN congestion, and the rejection of the TAU/RAU/Service Request could be cause by the general NAS level MM congestion control. The information X includes at least one of International Mobile Subscriber Identity (IMSI), UE Reachability Request Parameter for the MME/SGSN (URRP-MME/URRP-SGSN), and the SM/MM back-off timer. The URRP-MME/URRP-SGSN is a temporary data conditionally stored in the network control node (e.g. MME/SGSN) and the data base (e.g. HSS) in the core network. That is, the network control node sends the information X to the data base before receiving the queries UE activity from the data base, which is to inform the data base that the UE has the MM/SM back-off timer due to the network congestion. As a result, the data base can be informed of the information X of the UE when the UE is rejected with a back-off timer, thereby avoiding the data base keeps querying UE activities. Further, the signaling overhead can be reduced and overload can be prevented.

In addition, once the data base obtains the information X in the UE-activity-Notification message, the data base can forward the information to a service-related entity in the wireless communication system 10. The service-related entity is an entity in the wireless communication system 10 which may query the status of UE activities before enabling the communication with the UE for a particular service.

Figure 4:
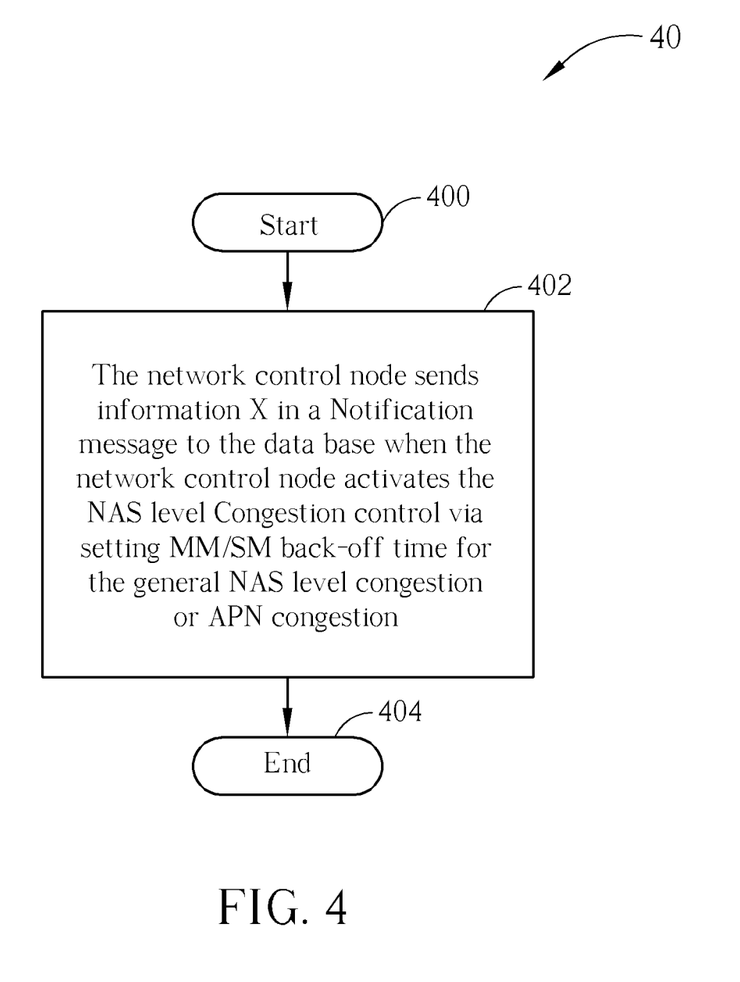

Please refer to FIG. 4, which is a flowchart of an exemplary process 40. The process 40 is used for handling queries caused overload in the data base (e.g. HSS/HLR) and network control node (e.g. MME/SGSN/MSC) in the core network in the wireless communication system 10. The process 40 may be compiled into the program code 214 and includes the following steps:

Step 400: Start.

Step 402: The network control node sends information X in a Notification message to the data base when the network control node activates the NAS level Congestion control via setting MM/SM back-off time for the general NAS level congestion or APN congestion.

Step 404: End.

According to the process 40, the network control node stores the MM context of the UE when the UE is attached to the access network. The network control node sends the information X in Notification message to the data base when the network control node activates the MM/SM back-off time for the general NAS level congestion control or APN congestion.

In other words, the network control node sends the information X in Notification message to the data base when the network control node begins initiating NAS level congestion control including general NAS level congestion control and/or APN based SM congestion control. The Notification message here can be a new type of notification message used for the process 40. The information X includes at least one of congested APN information, and the MM/SM back-off time. Please note that the MM/SM back-off time is a timestamp which is the duration that the core network plans to perform NAS level congestion control. Compared to the process 30, the core network herein sends the information X to the data base without waiting for the network control node rejecting the UE. As a result, the data base can be informed of the congestion situation in the network control node, thereby avoiding the data base keeps querying UE activities during network congestion. Further, the signaling overhead can be reduced and overload can be prevented.

In addition, once the data base obtains the information X in the Notification message, the data base can forward the information to a service-related entity in the wireless communication system 10. The service-related entity is an entity in the wireless communication system 10 which may query the status of UE activities before enabling the communication with the UE for a particular service.

Figure 5:
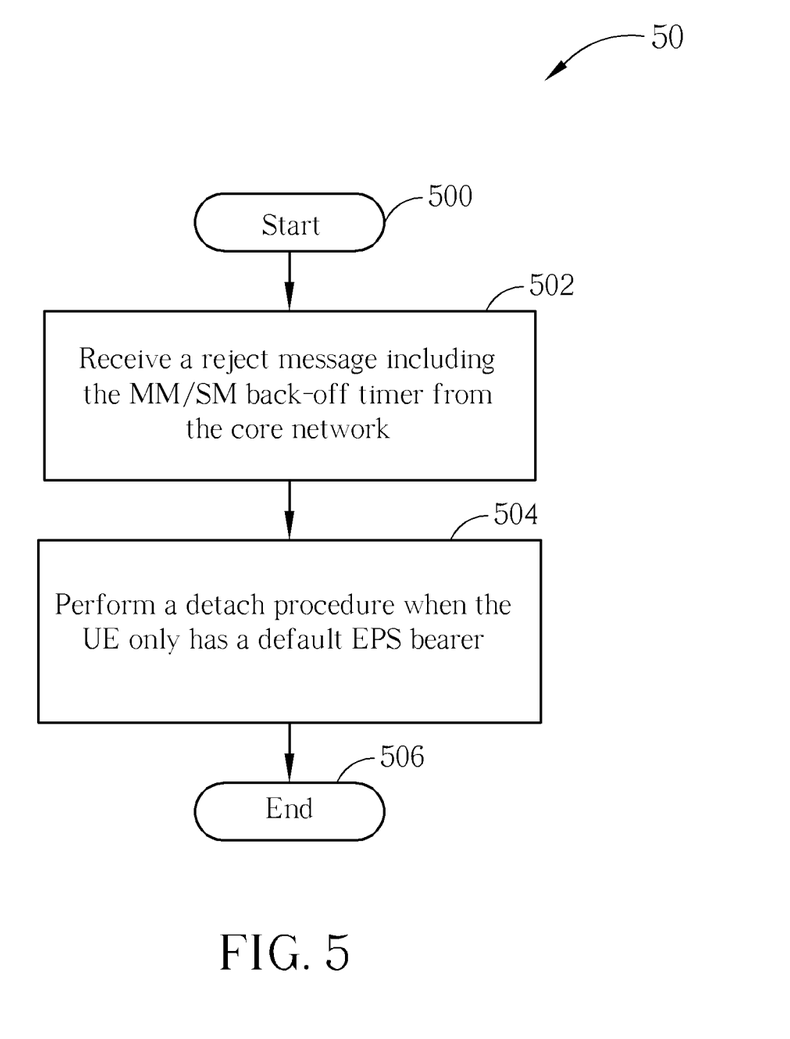

Please refer to FIG. 5, which is a flowchart of an exemplary process 50. The process 50 is used for handling queries caused overload in the data base (e.g. HSS/HLR) and network control node (e.g. MME/SGSN/MSC) in the core network in the wireless communication system 10. The UE has attached to the access network and has the MM context stored in the core network. The process 50 may be compiled into the program code 214 and includes the following steps:

Step 500: Start.

Step 502: Receive a reject message including the MM/SM back-off timer from the core network.

Step 504: Perform a detach procedure when the UE only has a default EPS bearer.

Step 506: End.

According to the process 50, when the rejected UE only has the default EPS bearer left after receiving the rejection message with the SM/MM back-off timer, the UE performs the detach procedure. The rejection could be caused by the general NAS Mobility Management congestion or APN based session management congestion control. Since the UE detaches from the network, the network control node can remove MM context, neither setting the URRP-MME/URRP-SGSN parameter of the UE nor replying with the UE activities if the data base makes a request for UE reachability.

Figure 6:
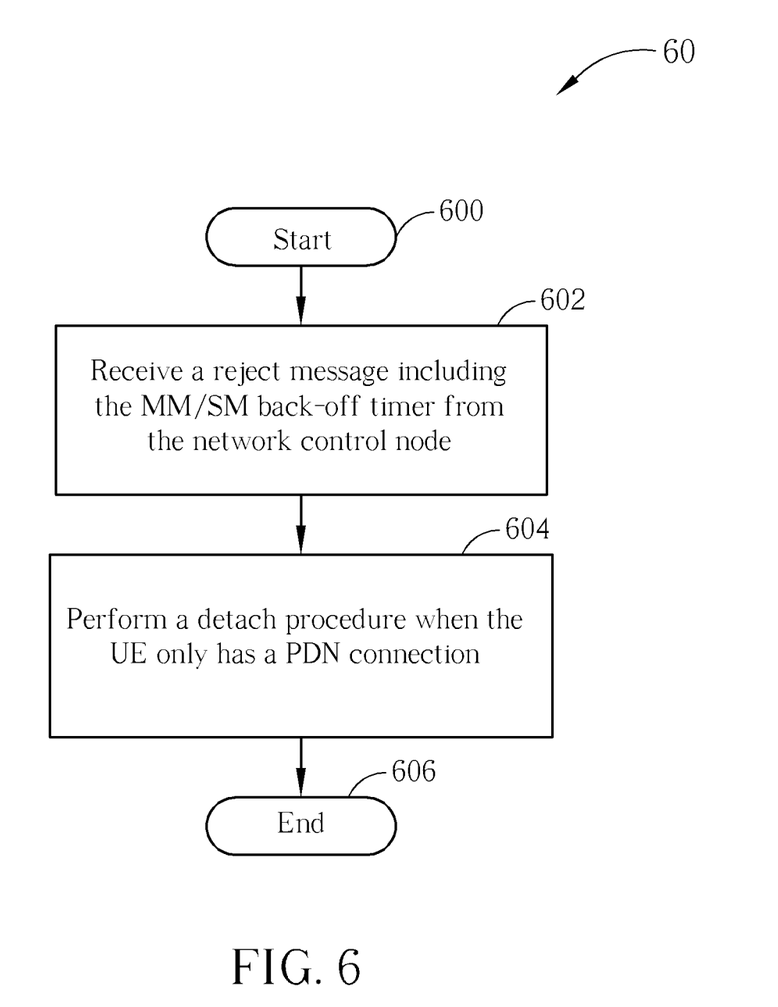

Please refer to FIG. 6, which is a flowchart of an exemplary process 60. The process 60 is used for handling queries caused overload in the data base (e.g. HSS/HLR) and network control node (e.g. MME/SGSN/MSC) in the core network in the wireless communication system 10. The UE has attached to the network and has the MM context stored in the network control node. The process 60 may be compiled into the program code 214 and includes the following steps:

Step 600: Start.

Step 602: Receive a reject message including the MM/SM back-off timer from the network control node.

Step 604: Perform a detach procedure when the UE only has a PDN connection.

Step 606: End.

According to the process 60, when the rejected UE only has one PDN connection (e.g. low priority) after receiving the rejection message with the MM/SM back-off timer, the UE performs the detach procedure. The rejection could be caused by the general NAS Mobility Management congestion or APN based session management congestion control. Since the UE detaches from the network, the network control node can remove MM context, neither setting the URRP-MME/URRP-SGSN parameter of the UE nor replying with the UE activities if the data base makes a request for UE reachability.

Figure 7:
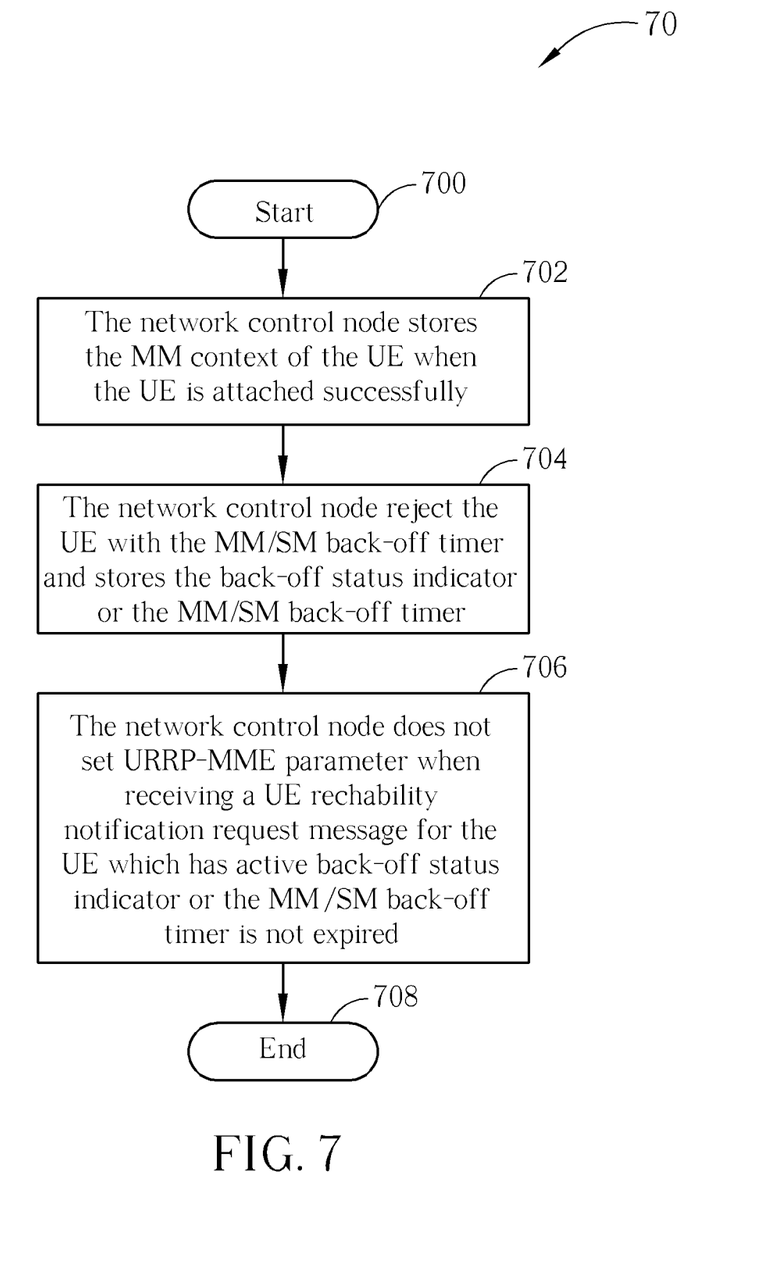

Please refer to FIG. 7, which is a flowchart of an exemplary process 70. The process 70 is used for handling queries caused overload in the data base (e.g. HSS/HLR) and network control node (e.g. MME/SGSN/MSC) in the core network in the wireless communication system 10. The network control node has a back-off status of the UE. The process 70 may be compiled into the program code 214 and includes the following steps:

Step 700: Start.

Step 702: The network control node stores the MM context of the UE when the UE is attached successfully.

Step 704: The network control node rejects the UE with the MM/SM back-off timer and stores the back-off status indicator or the MM/SM back-off timer.

Step 706: The network control node does not set URRP-MME parameter when receiving a UE-Reachability-Notification request message for the UE which has active back-off status indicator or the MM/SM back-off timer is not expired.

Step 708: End.

According to the process 70, the core network stores the MM context of the UE when the UE is attached to the access network. The core network rejects the UE with the MM/SM back-off timer due to the network congestion. The network control node has a back-off status of the UE via storing the back-off status indicator or MM/SM back-off timer. When the network control node receives the UE-Reachability-Notification request message for the UE whose MM/SM back-off timer is still running, the network control node does not set the URRP-MME/URRP-SGSN parameter of the UE, and responds a UE-Activity-Notification message, which indicates the UE as inactive, to the data base. Thus, the data base may regard the UE as inactivity.

Figure 8:
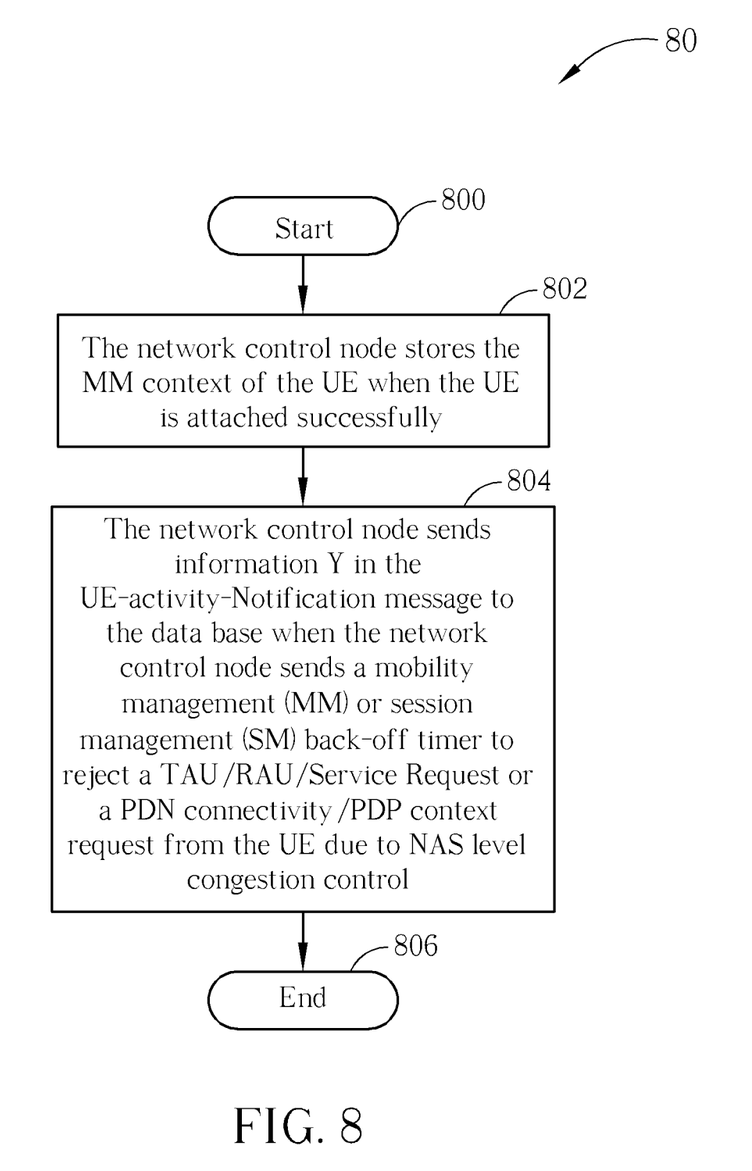

Please refer to FIG. 8, which is a flowchart of an exemplary process 80. The process 80 is used for handling queries caused overload in the data base (e.g. HSS/HLR) and network control node (e.g. MME/SGSN/MSC) in the core network in the wireless communication system 10. The process 80 may be compiled into the program code 214 and includes the following steps:

Step 800: Start.

Step 802: The network control node stores the MM context of the UE when the UE is attached successfully.

Step 804: The network control node sends information Y in the UE-activity-Notification message to the data base when the network control node sends a mobility management (MM) or session management (SM) back-off timer to reject a TAU/RAU/Service Request or a PDN connectivity/PDP context request from the UE due to NAS level congestion control.

Step 806: End.

According to the process 80, the network control node stores the MM context of the UE when the UE is attached to the network successfully. The network control node sends the information Y in the UE-activity-Notification message to the data base when the network control node sends the MM/SM back-off timer to reject the TAU/RAU/Service Request or PDN connectivity/PDP context request from the UE. The rejection of the PDN connectivity/PDP context request could be caused by the APN congestion. The information Y includes at least one of the IMSI, the URRP-MME/URRP-SGSN, and a back-off indicator. The back-off indicator indicates a back-off status of the UE. That is, the network control node sends the information Y to the data base before the queries from the data base, informing the data base that the UE has the MM/SM back-off timer due to the General NAS MM congestion or APN based congestion. As a result, the data base can be informed of the information Y of the UE when the UE is rejected with a back-off timer, thereby avoiding the data base keeps querying UE activities. Further, the signaling overhead can be reduced and overload can be prevented.

The network control node can keep the URRP-MME/URRP-SGSN parameter as active even if the network control node sends the UE-activity-Notification message with the back-off indicator to the data base to respond to the UE-Reachability-Notification request from the data base.

The network control node does not clear the URRP-MME/URRP-SGSN parameter until the MM/SM back-off timer expires. That is, when the UE starts to make a request (e.g. TAU/RAU/Service request or PDN connectivity/PDP context request), the MME sends UE activity notification message without including back-off indicator.

When the data base receives the information Y and the information Y includes the back-off indicator, the data base stores the back-off indicator and sets the back-off indicator as active. If the network control node does not send the back-off indicator in the information Y, the data base sets the back-off indicator as inactive upon reception of the information Y.

If the service-related entity requests for reachability of the UE, the data base checks the back-off indicator before setting the URRP-MME/URRP-SGSN parameter. The data base informs the service-related entity of the reachability of the UE according to the back-off indicator. For example, if the back-off indicator is active, the data base replies to the service-related entity that the UE is inactive due to back-off which means the UE has a running back-off timer. As a result, the service-related entity can be informed of the active back-off status of the UE, thereby avoiding the service-related entity keeps querying activities for a back-off UE. Further, the signaling overhead can be reduced and overload can be prevented.

Please note that, the abovementioned steps of the processes including suggested steps can be realized by means that could be a hardware, a firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include a system on chip (SOC), system in package (SiP), a computer on module (COM), and the communication device 20.

To sum up, for the UE which has attached to the access network and have MM context stored in the network control node (e.g. MME/SGSN/MSC), if the network control node rejects the PDN connectivity/PDP context request from the UE with the SM and/or MM back-off timer due the general NAS level MM congestion control or the APN based congestion control, the core network sends the information in the UE-activity-Notification message to the data base (e.g. HSS/HLR). The information includes at least one of the IMSI, the URRP-MME/URRP-SGSN and the back-off timer. In some examples, the information includes at least one of the IMSI, the URRP-MME/URRP-SGSN and the back-off indicator. If the rejected UE has only one PDN connection or the default EPS bearer, the UE performs the detach procedure. Or the network control node does not set the URRP-MME/URRP-SGSN when receiving the quarry request from the data base. This can prevent massive queries when the UE has a long back-off timer and reduce overload between the data base and the network control node.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of handling overload in a core network of a wireless communication system, the core network comprising a data base and a network control node which stores a mobility management (MM) context of a mobile device, the method comprising:
the network control node receiving a first request from the data base, wherein the first request comprises a user equipment (UE) Reachability Request Parameter (URRP) set as active; and
the network control node sending information to the data base, wherein the information comprises an International Mobile Subscriber Identity (IMSI) and a back-off indicator indicating a back-off status of the mobile device;
the network control node keeping the URRP as active after sending the back-off indicator in the information to the data base;
wherein the network control node sends the information to the data base in response to the received first request, and the data base stores the back-off indicator and sets the back-off indicator as active when the data base receives the back-off indicator in the information.

2. The method of claim 1, wherein the first request is generated by the data base in response to receiving a second request from a service-related entity directly or via a gateway connected to the service-related entity.

3. The method of claim 1, wherein the data base forwards the information to a service-related entity directly or via a gateway connected to the service-related entity when receiving the information.

4. The method of claim 1, wherein the data base checks the back-off indicator before the data base sets the URPP when a service-related entity requests for reachability of the mobile device to the data base.

5. The method of claim 1, wherein when the data base receives a third request from a service-related entity directly or via a gateway connected to the service-related entity, the data base replies to the service-related entity directly or via the gateway according to the back-off indicator.

6. The method of claim 5, wherein the third request is used to query reachability of the mobile device, and when the back-off indicator is active, the data base replies an active back-off status of the mobile device to the service-related entity.

7. The method of claim 2, wherein the second request is used to query reachability of the mobile device, and the first request is a UE reachability notification request message.

8. The method of claim 1, wherein the data base is a Home Subscriber Server (HSS) or a Home Location Register (HLR).

9. The method of claim 1, wherein the network control node is a mobility management entity (MME), a Serving GPRS Support Node (SGSN), or a Mobile Switching Center (MSC).

10. The method of claim 1, wherein the data base further sets the back-off indicator as inactive when the data base further receives from the network control node a message without including the back-off indicator, wherein the message is generated by the network control node when the network control node accepts a request from the mobile device.

* * * * *